United States Patent
Wong

(10) Patent No.: US 8,471,684 B2
(45) Date of Patent: Jun. 25, 2013

(54) SYSTEM AND METHOD FOR TRACKING ITEMS ASSOCIATED WITH READ/WRITABLE TAGS

(75) Inventor: Simon Yiu Tsung Wong, Toronto (CA)

(73) Assignee: BCE Inc., Verdun, Quebec (CA)

( * ) Notice: Subject to any disclaimer, the term of this patent is extended or adjusted under 35 U.S.C. 154(b) by 638 days.

(21) Appl. No.: 12/667,404

(22) PCT Filed: Sep. 25, 2007

(86) PCT No.: PCT/CA2007/001726
§ 371 (c)(1),
(2), (4) Date: Dec. 31, 2009

(87) PCT Pub. No.: WO2009/039604
PCT Pub. Date: Apr. 2, 2009

(65) Prior Publication Data
US 2010/0194545 A1 Aug. 5, 2010

(51) Int. Cl.
*H04Q 5/22* (2006.01)

(52) U.S. Cl.
USPC ............. 340/10.51; 340/572.1; 340/539.13

(58) Field of Classification Search
USPC .......... 340/539.1, 10.31, 10.1, 539.13, 572.1, 340/10.51, 13.26, 13.27; 235/835
See application file for complete search history.

(56) References Cited

U.S. PATENT DOCUMENTS

| | | | | |
|---|---|---|---|---|
| 7,124,943 B2 * | 10/2006 | Quan et al. | | 235/451 |
| 7,173,515 B2 * | 2/2007 | Ohki et al. | | 340/5.61 |
| 7,177,399 B2 * | 2/2007 | Dawson et al. | | 379/45 |
| 7,218,228 B2 * | 5/2007 | Sakamoto et al. | | 340/572.1 |
| 7,580,724 B2 * | 8/2009 | Ueda | | 455/550.1 |
| 7,961,078 B1 * | 6/2011 | Reynolds et al. | | 340/10.2 |
| 7,969,306 B2 * | 6/2011 | Ebert et al. | | 340/572.1 |
| 8,022,811 B2 * | 9/2011 | Konuma | | 340/10.1 |
| 8,042,737 B2 * | 10/2011 | Rehman | | 235/385 |
| 2002/0134836 A1 * | 9/2002 | Cash et al. | | 235/385 |
| 2002/0175805 A9 * | 11/2002 | Armstrong et al. | | 340/10.31 |
| 2003/0144985 A1 * | 7/2003 | Ebert | | 707/1 |
| 2004/0008123 A1 * | 1/2004 | Carrender et al. | | 340/825.49 |
| 2004/0155778 A1 * | 8/2004 | Shek et al. | | 340/572.1 |
| 2004/0252023 A1 * | 12/2004 | Xydis | | 340/539.11 |

(Continued)

FOREIGN PATENT DOCUMENTS

EP 1708468 A1 10/2006

OTHER PUBLICATIONS

International Search Report mailed on Jun. 25, 2008 in connection with International Patent Application No. PCT/CA2007/001726.
Written Opinion of the International Searching Authority mailed on Jun. 25, 2008 in connection with International Patent Application No. PCT/CA2007/001726.

(Continued)

*Primary Examiner* — Jennifer Mehmood
*Assistant Examiner* — Rufus Point

(57) ABSTRACT

A method and system for tracking an item associated with a read/writable tag programmed with a current identifier. The system comprises a plurality of tag readers and a control entity configured to send to at least one of the tag readers a next identifier associated with the tag. Upon receipt of the next identifier, the at least one of the tag readers is configured to reprogram the tag with the next identifier when a presence of the tag is detected. The control entity may be further configured to identify each of the at least one of the tag readers as being a tag reader that the item has a potential to encounter.

30 Claims, 9 Drawing Sheets

U.S. PATENT DOCUMENTS

| | | | |
|---|---|---|---|
| 2004/0257224 A1* | 12/2004 | Sajkowsky | 340/539.13 |
| 2005/0040232 A1* | 2/2005 | Maloney | 235/385 |
| 2005/0093698 A1* | 5/2005 | Sakamoto et al. | 340/572.1 |
| 2005/0145688 A1* | 7/2005 | Milenkovic et al. | 235/375 |
| 2005/0190892 A1* | 9/2005 | Dawson et al. | 379/37 |
| 2006/0055552 A1* | 3/2006 | Chung et al. | 340/686.1 |
| 2006/0181397 A1* | 8/2006 | Limbachiya | 340/10.51 |
| 2007/0001854 A1* | 1/2007 | Chung et al. | 340/572.1 |
| 2007/0013519 A1* | 1/2007 | Chung et al. | 340/572.1 |
| 2008/0073432 A1* | 3/2008 | Barenburg et al. | 235/385 |
| 2008/0094182 A1* | 4/2008 | Sugano et al. | 340/10.5 |
| 2008/0094220 A1* | 4/2008 | Foley et al. | 340/572.4 |
| 2008/0224833 A1* | 9/2008 | Aikawa et al. | 340/10.51 |
| 2008/0309461 A1* | 12/2008 | Mizuki et al. | 340/10.1 |
| 2009/0109870 A1* | 4/2009 | Metke et al. | 370/254 |
| 2010/0164710 A1* | 7/2010 | Chung et al. | 340/539.1 |
| 2010/0194545 A1* | 8/2010 | Wong | 340/10.51 |

OTHER PUBLICATIONS

"3M Digital Materials Flow Management", © 2000, 3M IPC., 2 pages, 3M Library Systems, St. Paul, MN, U.S.A., www.3M.com/library.

Fred Niederman et al., "Examining RFID Applications in Supply Chain Management", Communications of the ACM, Jul. 2007/vol. 50, No. 7, pp. 93-101.

"Real-Time Location Identification for IP Phones" Redsky Network Discovery, © 2006 RedSky Technologies, Inc., Chicago, IL, U.S.A., 2 pages, www.redskyE911.com.

"Contactless Smart Cards vs. EPC Gen 2 RFID Tags: Frequently Asked Questions", Smart Card Alliance Identity Council, Jul. 2006, Smart Card Alliance © 2006, 6 pages.

Javed Sikander, "RFID Enabled Retail Supply Chain", © 2007 Microsoft Corp., Apr. 2005, Aug. 2, 2007, 21 pages, http://msdn2.microsoft.com/en-us/library/ms954628(d=printer).aspx.

Marcel Queisser et al., "Cataloging RFID Privacy and Security", Databases and Distributed Systems Group, as early as Apr. 18, 2007, 6 pages, Germany.

Tom Kevan, "Sorting out the RFID tag debate: read-only or read/write? Weigh all the elements carefully to get the right results—RFID/ADC", Aug. 1, 2007, 2 pages, http://findarticles.com/p/articles/mi_m0DIS/is_12_4/ai_112366616/print.

\* cited by examiner

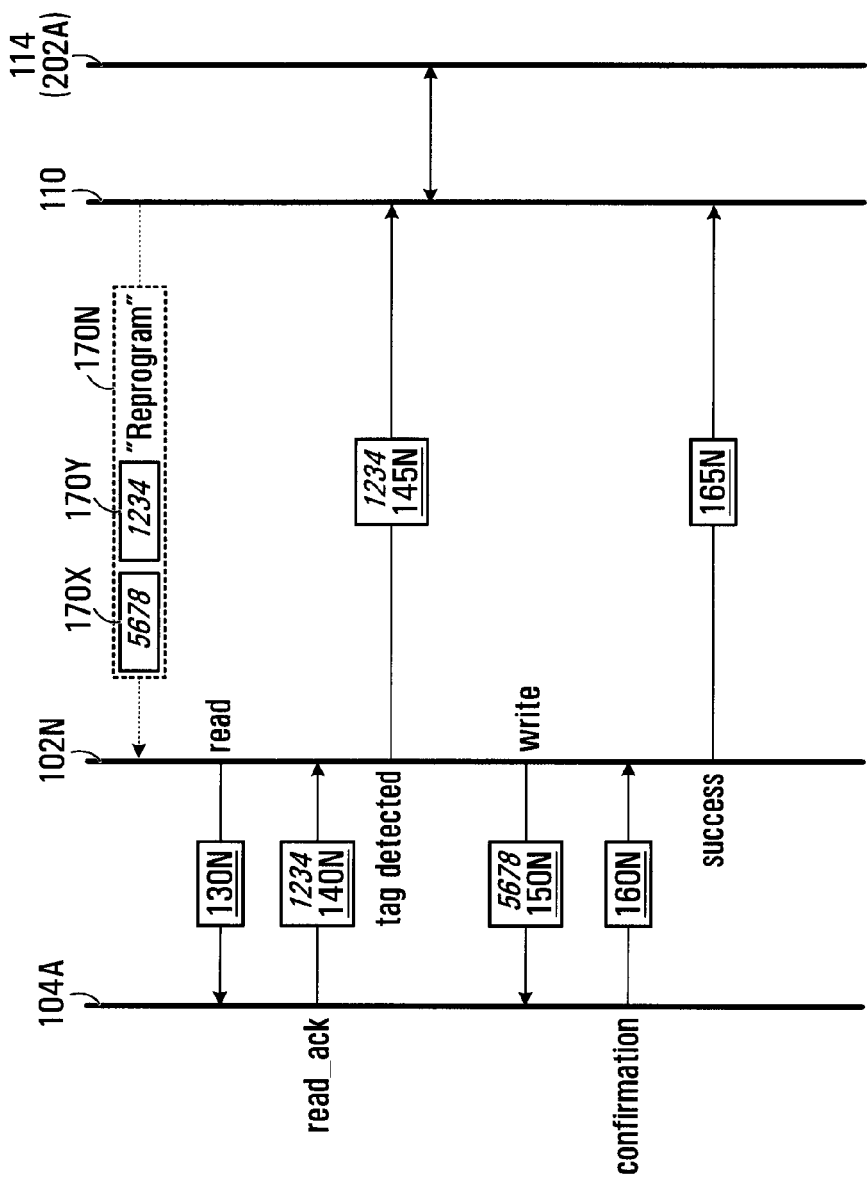

SYSTEM AND METHOD FOR TRACKING ITEMS ASSOCIATED WITH READ/WRITABLE TAGS

FIELD OF THE INVENTION

The present invention relates generally to items associated with read/writable tags and, more particularly, to a system and method for use in tracking such items.

BACKGROUND

Radio-frequency identification (RFID) tags have many uses, one of which is to track the progress of goods across a supply chain. When an item is tagged, the tag is assigned a unique "tag identifier" and a corresponding entry is written into a database. Later, when the tag is observed, the tag identifier can be used as an index to the item in the database. Thus, if the tag is observed at a specific times by a specific readers located in a warehouse, for example, the time and reader information can be entered into the database in association with the tag identifier of the observed tag, so as to track location and/or motion of the item throughout the warehouse. Operations on a larger scale have also been implemented, whereby goods are tracked across cities and even continents.

Tags can be one-time programmable or read/writable. Read/writable tags have advantages over one-time programmable tags because they allow the same tag to be reprogrammed with a different tag identifier multiple times, such as at different points of the supply chain. With the ability to reprogram a tag, it is now possible to encode information directly on the tag, such as historical data about the parties in the supply chain that have handled the item, or whether the item is considered to have entered or exited a given warehouse, and so on.

Before reprogramming a given tag, however, it may be necessary to obtain more specific information about the associated item by consulting the database. In fact, the database itself may contain data that is intended to be downloaded to the tag, such as new information acquired or generated since the last time that the tag was (re)programmed. However, when the item whose tag is to be reprogrammed is physically in motion (e.g., on a truck or a train), the time required to consult the database, obtain new information for that tag and effect reprogramming may cause an unwanted delay in the item's progress along the supply chain.

Against this background, there is a need in the industry for an improved system and method for tracking items associated with read/writable tags.

SUMMARY OF THE INVENTION

According to a first broad aspect, the present invention seeks to provides a system for tracking an item associated with a read/writable tag programmed with a current identifier. The system comprises a plurality of tag readers and a control entity configured to send to at least one of said tag readers a next identifier associated with said tag. Upon receipt of the next identifier, said at least one of said tag readers is configured to reprogram said tag with the next identifier when a presence of said tag is detected.

According to a second broad aspect, the present invention seeks to provide a method for tracking an item associated with a read/writable tag programmed with a current identifier. The system comprises sending to at least one of a plurality of tag readers a next identifier associated with said tag and reprogramming said tag with the next identifier when a presence of said tag is detected after receipt of the next identifier.

According to a third broad aspect, the present invention seeks to provide a computer-readable medium comprising computer-readable program code which, when interpreted by a computing apparatus, causes the computing apparatus to execute a method of tracking an item associated with a read/writable tag programmed with an identifier. The computer-readable program code comprises first computer-readable program code for causing the computer to identify at least one of tag reader that the item has a potential to encounter and second computer-readable program code for causing the computer to send to said at least one tag reader a next identifier for reprogramming of said tag.

According to a fourth broad aspect, the present invention seeks to provide a tag reader used in a system for tracking items associated with read/writable tags programmed with respective identifiers. The tag reader comprises means attentive to receipt of a next identifier associated with a particular tag; means for detecting a presence of said particular tag; and means for reprogramming the particular tag with the next identifier in response to said detecting.

According to a fifth broad aspect, the present invention seeks to provide a method implemented by a tag reader used in a system for tracking items associated with read/writable tags programmed with respective identifiers. The method comprises receiving a next identifier associated with a particular tag; detecting a presence of said particular tag; and reprogramming the particular tag with the next identifier in response to said detecting.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 3 is a message flow diagram illustrating a successful reprogram operation involving a particular tag, a nearby tag reader and a control entity;

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1A:
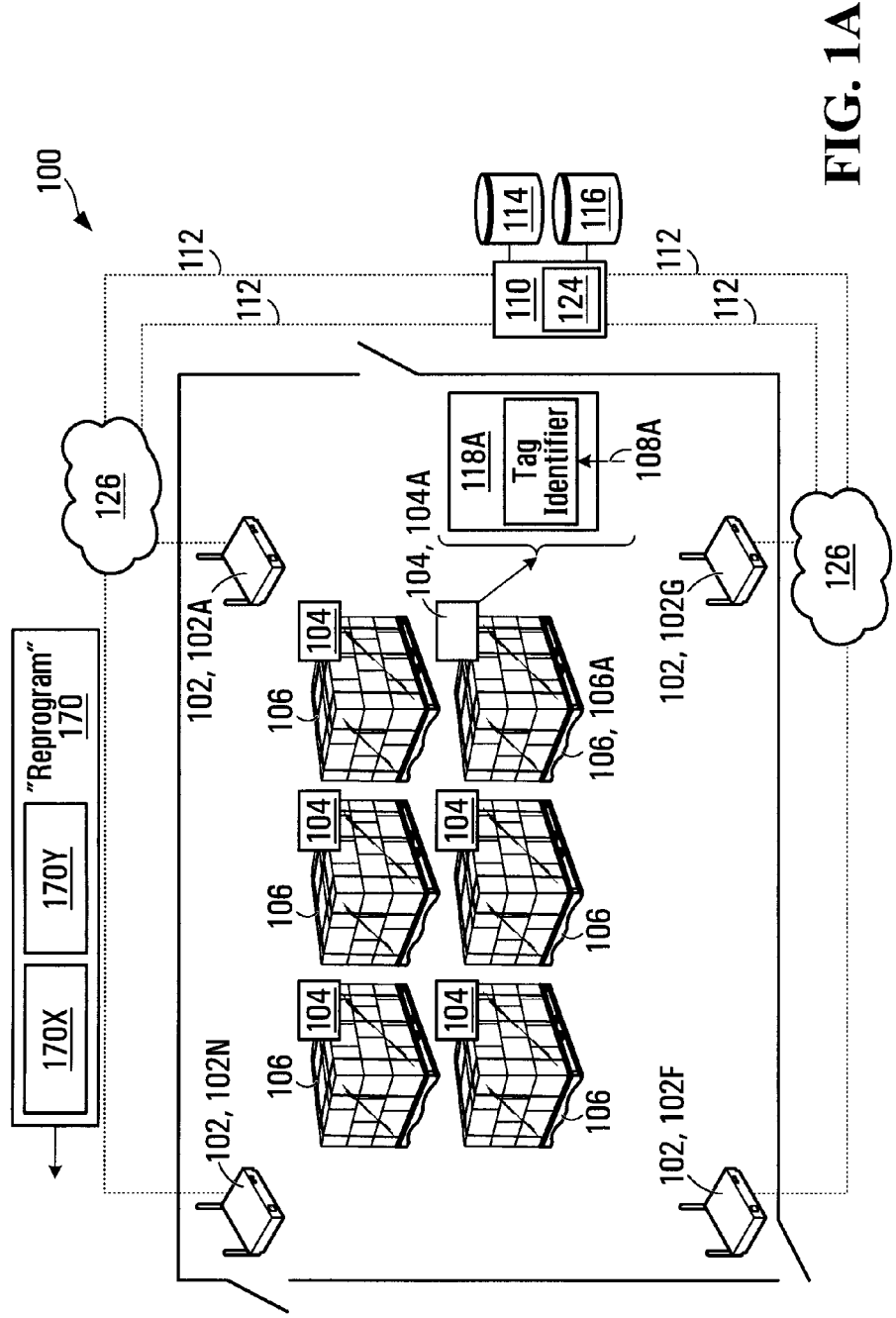
FIG. 1A is a block diagram of a system for detecting and reprogramming tags associated with various items that can be in motion within a given environment.

Reference is made to FIG. 1A, which shows a system 100 for detecting and reprogramming tags 104 associated with various items 106 that can be in motion within a given environment. Non-limiting examples of items 106 include transportable objects such as cases, pallets, boxes, etc., as well animals, humans, vehicles and other entities capable of autonomous motion. The system comprises an arrangement of interrogators, hereinafter referred to as "tag readers" 102. In a typical but non-limiting scenario to which the present invention applies, the items 106 correspond to goods whose progress along a supply chain is being tracked by detection of the corresponding tags 104 at individual ones of the tag readers 102. The tags 104 may be of various types, including but not limited to radio-frequency identification (RFID) tags, in which case the tag readers 102 are equipped with radio-frequency transceivers. Of course, other possibilities are within the scope of the present invention, and include, without limitation, technologies based on magnetic swipe cards, NFC (near-field communications) technologies including contact-less cards (paypass, dexit), and so on.

Figure 1B:
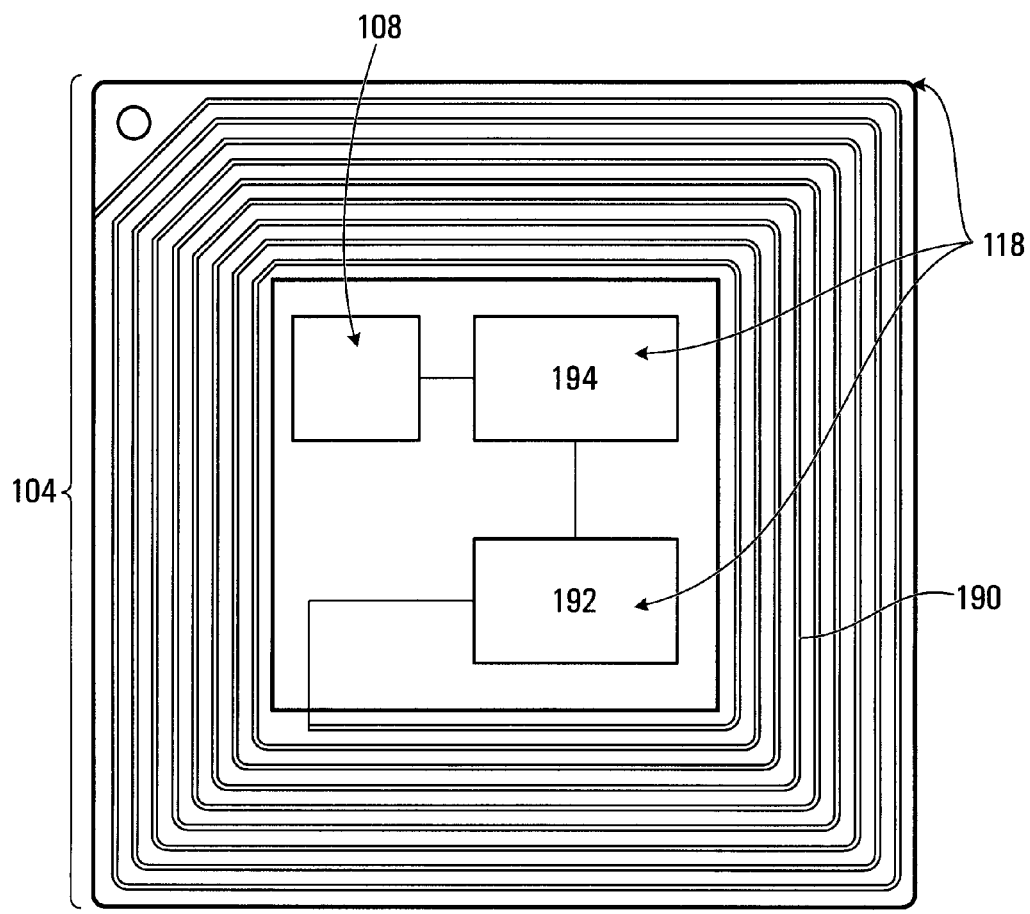
FIG. 1B depicts a tag suitable for use in FIG. 1A.

As shown in FIG. 1B, each of the tags 104 comprises a storage medium 108 (e.g., a memory), an antenna 190 coupled to a transceiver unit 192, and a controller 194 for accessing the storage medium 108. The antenna 190, the transceiver unit 192 and the controller 194 are hereinafter referred to as an interface 118. The contents of the storage medium 108 can be read from and written to by the tag readers 102. In that sense, the tags 104 can be referred to as read/writable tags, while the tag readers 102 are in fact capable of both reading data from, and writing data to, the storage medium 108 of the various tags 104.

With continued reference to FIG. 1A, consider one of the tags 104 denoted 104A and associated with one of the items 106 denoted 106A, and which comprises a storage medium 108A accessible via an interface 118A. The contents of storage medium 108A can consist of data that relates to item 106A, including information about item 106A and/or its progress along the supply chain, such as the identity of the most recent one of the tag readers 102 it has encountered, etc. At least part of the data stored in storage medium 108A, hereinafter referred to as a "tag identifier", can be updated by a reprogramming operation applied to tag 104A by successive ones of the tag readers 102 encountered tag 104A.

Figure 1C:
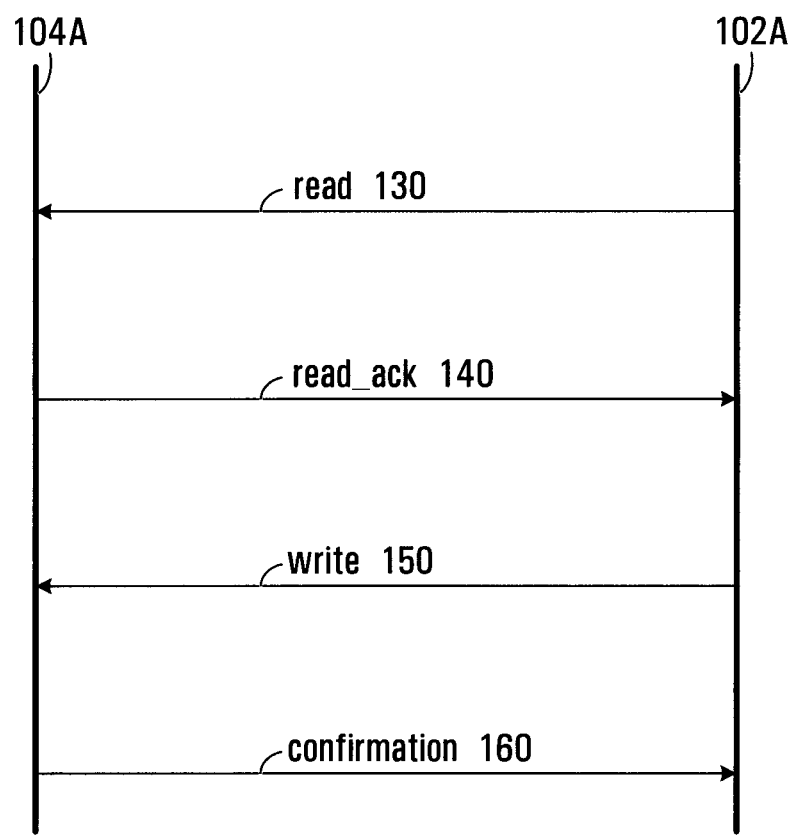
FIG. 1C is a message flow diagram illustrating a read operation and a reprogram operation executed by a tag reader on a given tag.

Specifically, when tag 104A arrives in the vicinity of a given one of the tag readers 102 (say, tag reader 102A), tag reader 102A detects the presence of tag 104A via interface 118A, e.g., electromagnetically or through contact means. Tag reader 102A then causes tag 104A to release the contents of storage medium 108A, which contains a "current" tag identifier for tag 104A. For example, with reference to FIG. 1C, tag reader 102A can send a READ command 130 to tag 104A, which elicits a READ_ACK message 140 from tag 104A containing the current tag identifier for tag 104A. Upon receipt of the READ_ACK message 140, tag reader 102A effects further operations, if it has been instructed to do so by a control entity 110.

One such "further operation" may be an operation to reprogram tag 104A with a new tag identifier for tag 104A, such new tag identifier having been previously received from the control entity 110. Accordingly, tag reader 102A can issue a WRITE command 150 to tag 104A containing the new tag identifier for tag 104A. Tag 104A receives the WRITE command 150 containing the new tag identifier for tag 104A via interface 118A and causes the current tag identifier in storage medium 108A to be replaced with the new tag identifier for tag 104A. Tag 104A then issues a CONFIRMATION message 160 via interface 118A, which is received by tag reader 102A, thereby informing tag reader 102A that the reprogramming operation was successful.

In one embodiment, the tag readers 102 are connected to the control entity 110 via respective links 112, each of which may traverse one or more respective network portions. For example, the control entity 110 may be implemented as a server or other computing apparatus at a warehouse, while the tag readers 102 may be implemented as clients which connect via links 112 over a network 126, which can include a wireless network and may traverse a public data network such as the Internet. In another embodiment, the tag readers 102 and the control entity 110 may all be connected as peer devices on a physical or virtual local area network (not shown). In yet another embodiment, the control entity 110 could be implemented as a distributed appliance having components in the vicinity of one or more tag readers 102, or integrated with the tag readers 102 themselves.

The control entity 110 may comprise suitable hardware, software (e.g., computer-readable program code) and/or control circuitry configured to implement a control function for interacting with, reacting to information received from, and controlling certain activities of, the tag readers 102. For example, the control entity 110 can decide to (a) instruct individual ones of the tag readers 102 to perform certain functions, as well as (b) perform certain other functions based on (i) data collected from the tag readers 102 and (ii) other contextual information or policies implemented by an entity that manages the environment in which the tag readers 102 are located.

In a non-limiting embodiment of the present invention, the control function implemented by the control entity 110 and having regard to tag 104A comprises steps of:
(I) keeping track of a new tag identifier to be written to tag 104A;
(II) identifying a subset of one or more tag readers that item 106A has the potential to encounter; and
(III) transmitting to the identified tag reader(s) the new tag identifier to be written to tag 104A.

In other words, the control function determines one or more locations/areas where tag 104A is susceptible of appearing at a future time and then pre-loads one or more tag readers in the vicinity of these locations with the new tag identifier for tag 104A, so that these nearby tag reader(s) can execute a tag reprogramming operation on tag 104A remotely, without having to query the control entity 110 for information.

Figure 2A:
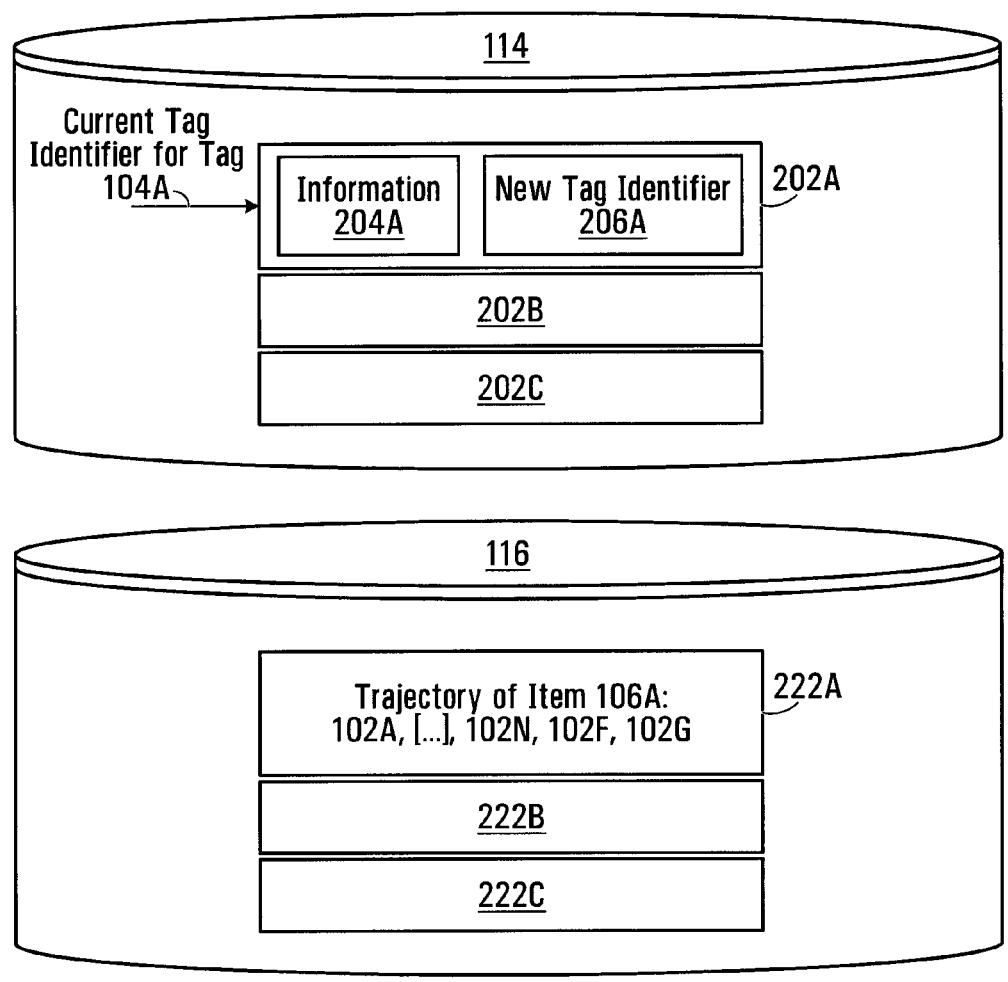
FIG. 2A shows a tag database storing information regarding tags and a trajectory database storing information regarding trajectories of items.

In order to effect step (I) of the control function, the control entity 110 may comprise suitable hardware, software (e.g., computer-readable program code) and/or control circuitry configured to maintain a tag database 114. Specifically, and as shown in FIG. 2A, the tag database 114 stores a record 202A for item 106A which can be indexed by a tag identifier that represents the current, up-to-date contents of storage medium 108A as far as the control entity 110 is concerned.

Record 202A includes an INFORMATION field 204A that stores information about item 106A as well as a NEW TAG IDENTIFIER field 206A that stores a tag identifier to be written to tag 104A at a future time. The tag database 114 also includes other records 202B, 202C that store information about other items and their corresponding tag identifiers. Each particular record in the tag database 114 can be rendered inaccessible to all but authorized parties, such as parties having a claim to the specific item about which information is stored in the particular record.

Information about item 106A that may be stored in the INFORMATION field 204A of record 202A can include a serial number, data regarding a manufacturer or provenance, a time and date of manufacture, an expiry date, and one or more past locations along the trajectory of item 106A (e.g., in the form of the identity of one or more tag readers 102 previously encountered by item 106A), to name a few non-limiting possibilities.

Some information about item 106A may also be encoded in the NEW TAG IDENTIFIER field 206A of record 202A, which stores the tag identifier to be written to tag 104A at a future time. For example, the tag identifier stored in the NEW TAG IDENTIFIER field 206A of record 202A could contain the identity of one or more tag readers 102 that tag 104A is susceptible of encountering. In other cases, the tag identifier stored in the NEW TAG IDENTIFIER field 206A of record 202A is simply a random number. To this end, the control entity 110 may comprise suitable hardware, software (e.g., computer-readable program code) and/or control circuitry configured to implement or access a randomization function 124, which can comprise a random number generator for ensuring that certain information used to construct the tag identifier stored in the NEW TAG IDENTIFIER field 206A is not predictable on the basis of any previous tag identifier used by tag 104A. Also, it should be appreciated that the tag identifier stored in the NEW TAG IDENTIFIER field 206A of record 202A may, but need not, abide by the same format as the current tag identifier residing in storage medium 108A.

Returning to step (II) of the control function, the control entity 110 can proceed in a variety of ways in order to identify one or more of the tag readers 102 that item 106A has the potential to encounter. In one non-limiting example embodiment, the control entity 110 may comprise suitable hardware, software (e.g., computer-readable program code) and/or control circuitry configured to observe past movement of item 106A and predict with a certain degree of confidence (e.g., based on topographic extrapolations and/or a historical pattern) that a specific tag reader, say 102N, will be encountered.

In another non-limiting example embodiment, the control entity 110 may comprise suitable hardware, software (e.g., computer-readable program code) and/or control circuitry configured to consult a trajectory database 116. With reference back to FIG. 2A, the trajectory database 116 stores a record 222A for item 106A which includes information regarding a trajectory that item 106A is scheduled to follow. The trajectory database 116 also stores other records 222B, 222C which include information on the respective scheduled trajectories of other items. The information regarding the scheduled trajectory of a given item can be expressed as a sequence of data elements representing individual ones of the tag readers 102 or as a sequence of geographic or event-specific locations, which can be registered to individual ones of the tag readers 102 (whose locations are presumed known) by consulting a map (not shown). Thus, with the knowledge of which of the tag readers 102 was most recently encountered by item 106A, consultation of the trajectory database 116 will reveal the identity of a specific one of the tag readers 102 that item 106A is expected to encounter, which in this specific example corresponds to tag reader 102N.

In yet another non-limiting example embodiment, the control entity 110 might not single out one specific tag reader, but rather may identify several tag readers (e.g., one at each of a plurality of warehouse bays), each having a certain likelihood/susceptibility of being encountered by item 106A.

Also, it should be understood that while it is certainly a possibility, it is not a requirement that a tag reader identified at step (II)—in the example of FIG. 1A this is tag reader 102N—be an immediate next one of the tag readers 102 to be encountered by item 106A. In other words, other ones of the tag readers 102 may be encountered between now and the time at which tag reader 102N is encountered, but for the purposes of reprogramming tag 104A, tag reader 102N is where the reprogramming operation for tag 104A will next take place.

Returning now to step (III) of the control function, and with reference to FIG. 1A, the control entity 110 may comprise suitable hardware, software (e.g., computer-readable program code) and/or control circuitry configured to transmit a REPROGRAM message 170 to the one or more tag readers identified at step (II) (in this case tag reader 102N) over the appropriate one of the links 112 (in this case denoted 112N). The REPROGRAM message 170 includes a first data portion 170X containing a new tag identifier for tag 104A. The first data portion 170X therefore serves to provide tag reader 102N with the information that will be used to reprogram a particular tag. Additionally, in order to identify the particular tag to be reprogrammed in this fashion, the REPROGRAM message 170 comprises a second data portion 170Y, which can specify the current tag identifier for tag 104A. Thus, upon receipt of the REPROGRAM message 170, tag reader 102N knows that when a tag whose tag identifier corresponds to the second data portion 170Y of the REPROGRAM message 170 is detected, this tag is to be re-programmed with the content of the first data portion 170X. Of course, in the present example, the tag in question corresponds to tag 104A.

Operation of various components of the system 100 is now described with reference to FIG. 3, which deals with the case where item 106A travels throughout the environment of FIG. 1A and enters an area where tag 104A is detectable by one of the tag reader(s) identified at step (II) and to which the REPROGRAM message 170 was sent at step (III). This non-limiting example will be described with reference to tag reader 102N. For the purposes of the present example, the current tag identifier for tag 104A as contained in storage medium 108A is "1234". Also, by virtue of steps (I), (II) and (III) of the control function executed by the control entity 110, tag reader 102N is assumed to have previously received a REPROGRAM message 170N from the control entity 110; in this example, the first data portion of the REPROGRAM message 170N is assumed to have contained a new tag identifier (e.g., "5678") and the second data portion of the REPROGRAM message 170N is assumed to have contained tag identifier "1234". As a result, tag reader 102N knows that when a nearby tag is detected as having a tag identifier of "1234" (i.e., when tag 104A is detected), this tag is to be reprogrammed with tag identifier "5678".

Assume now that tag 104A is indeed detected by tag reader 102N. Specifically, in response to tag reader 102N sending a READ command 130N to tag 104A, tag 104A returns a READ_ACK message 140N from tag 104A containing tag identifier "1234". Optionally, tag reader 102N can then send a TAG DETECTED message 145N to the control entity 110, advising the latter that a tag with tag identifier "1234" has been detected by tag reader 102N. If invoked, this functionality allows the control entity 110 to update the tag database 114 with relevant information regarding this event. For example, the control entity 110 can query the tag database 114 on the basis of the detected tag identifier (namely, "1234"), which will return record 202A associated with item 106A. The control entity 110 can update record 202A such as by modifying the INFOR- MATION field 204A to add the identity of tag reader 102N to the list of tag readers that have been encountered by item 106A along its trajectory.

At this point, tag reader 102N realizes that the detected tag identifier (namely, "1234") corresponds to a tag identifier that has been identified in the previously received REPROGRAM message 170N, which carried the new tag identifier "5678". Accordingly, tag reader 102N issues a WRITE command 150N to tag 104A to reprogram the latter's storage medium 108A with tag identifier "5678". Tag reader 102N then awaits a response from tag 104N. Meanwhile, tag 104A processes the WRITE command 150N received via interface 118A, retrieves tag identifier "5678" contained therein, and causes the portion of storage medium 108A that contained tag identifier "1234" to be replaced with tag identifier "5678". Thus, assuming that the above reprogramming operation was successful, the current tag identifier for tag 104A becomes "5678".

Continuing to assume that the reprogramming operation was successful, tag 104A issues a CONFIRMATION message 160N via interface 118A, which is received by tag reader 102N, thereby allowing tag reader 102N to confirm that the reprogramming operation was indeed successful. Assuming then that tag reader 102N has confirmed that the reprogramming operation was successful (based on receipt of the CONFIRMATION message 160N), tag reader 102N can inform the control entity 110 of this fact by issuing a SUCCESS message 165N. Upon receipt of the SUCCESS message 165N, the control entity 110 updates the tag database 114 (more specifically, record 202A in the tag database 114) with relevant information regarding this event.

For example, the control entity 110 can modify the way in which record 202A is accessed, making it now exclusively indexed on the basis of the new version of the current tag identifier (namely "5678") rather than the previous version (namely "1234"). It is also within the scope of the present invention for the control entity 110 to delete any association between item 106A and tag identifier "1234".

Additionally, the control entity 110 continues executing the control function, which at step (I) includes generation of a further new tag identifier for tag 104A (e.g., "ABCD"). Also, record 202A is updated by modifying the NEW TAG IDENTIFIER field 206A to reflect tag identifier "ABCD" as opposed to tag identifier "5678", which was previously referred to as the "new" tag identifier but is now the current tag identifier for tag 104A. The aforesaid randomization function 124 may be called upon to assist in generation of tag identifier "ABCD". The randomization function 124 can be used to ensure that certain information used to construct the further new identifier for tag 104A is not predictable on the basis of the any previous tag identifier for tag 104A.

Figure 4:
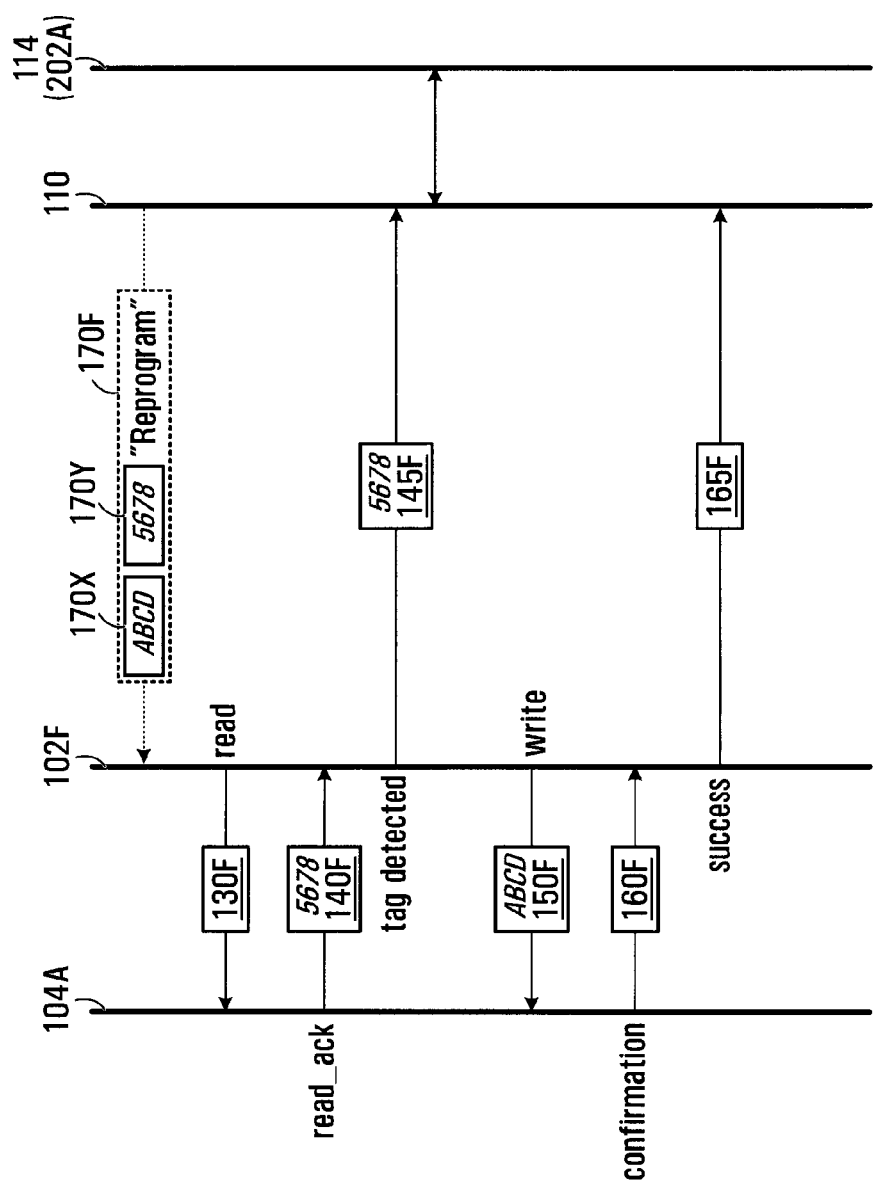
FIG. 4 is a message flow diagram which is a continuation of FIG. 3 and illustrates a further reprogram operation involving the particular tag, a second tag reader and the control entity.

Meanwhile, and with reference now to FIG. 4, item 106A continues to move according to its own trajectory. By virtue of step (II) of the control function, the control entity 110 determines that item 106A may potentially encounter another one or more of the tag readers 102, in this case denoted 102F. Tag reader 102F may be geographically separate from tag reader 102N. Then, by virtue of step (III) of the control function, the control entity 110 sends a REPROGRAM message 170F to the identified tag reader(s); in this example, the identifier tag reader(s) includes tag reader 102F; also, the first data portion of the REPROGRAM message 170F contains tag identifier "ABCD" and the second data portion of the REPROGRAM message 170F contains tag identifier "5678". As a result, tag reader 102F knows that when a nearby tag is detected as having a tag identifier of "5678" (i.e., when tag 104A is detected), this tag is to be reprogrammed with tag identifier "ABCD".

The remainder of the procedure is similar to that which was described above, except that tag 104A is detected by tag reader 102F rather than by tag reader 102N. Specifically, tag reader 102F sends a READ command 130F to tag 104A, in response to which tag 104A returns a READ_ACK message 140F from tag 104A containing tag identifier "5678" (recalling that the first reprogramming operation has successfully taken place). Tag reader 102F then optionally sends a TAG DETECTED message 145F to the control entity 110, advising the latter that a tag with tag identifier "5678" has been detected by tag reader 102F. This allows the control entity 110 to update the tag database 114 with relevant information regarding this event. For example, the control entity 110 can query the tag database 114 on the basis of the detected tag identifier (namely, "5678"), which will return record 202A associated with item 106A.

The control entity 110 can update record 202A such as by modifying the INFORMATION field 204A to add the identity of tag reader 102F to the list of tag readers that have been encountered by item 106A along its trajectory.

At this point, tag reader 102F realizes that the detected tag identifier (namely, "5678") corresponds to a tag identifier that has been identified in the previously received REPROGRAM message 170F, which carried the new tag identifier "ABCD". Accordingly, tag reader 102F issues a WRITE command 150F to tag 104A to reprogram the latter's storage medium 108A with tag identifier "ABCD". Tag reader 102F then awaits a response from tag 104F. Meanwhile, tag 104A processes the WRITE command 150F received via interface 118A, retrieves tag identifier "ABCD" contained therein, and causes the portion of storage medium 108A that contained tag identifier "5678" to be replaced with tag identifier "ABCD". Thus, assuming that this second reprogramming operation was successful, the current tag identifier for tag 104A becomes "ABCD".

Continuing to assume that the second reprogramming operation was successful, tag 104A issues a CONFIRMATION message 160F via interface 118A, which is received by tag reader 102F, thereby allowing tag reader 102F to confirm that the second reprogramming operation was indeed successful. Assuming then that tag reader 102F has confirmed that the second reprogramming operation was successful (based on receipt of the CONFIRMATION message 160F), tag reader 102F can inform the control entity 110 of this fact by issuing a SUCCESS message 165F. Upon receipt of the SUCCESS message 165F, the control entity 110 updates the tag database 114 (more specifically, record 202A in the tag database 114) with relevant information regarding this event.

For example, the control entity 110 can modify the way in which record 202A is accessed, making it now exclusively indexed on the basis of the new version of the current tag identifier (namely "ABCD") rather than the previous version (namely "5678"). It is also within the scope of the present invention for the control entity 110 to delete any association between item 106A and tag identifier "5678". This process can continue over and over substantially as described above, as item 106A follows its trajectory.

Figure 5:
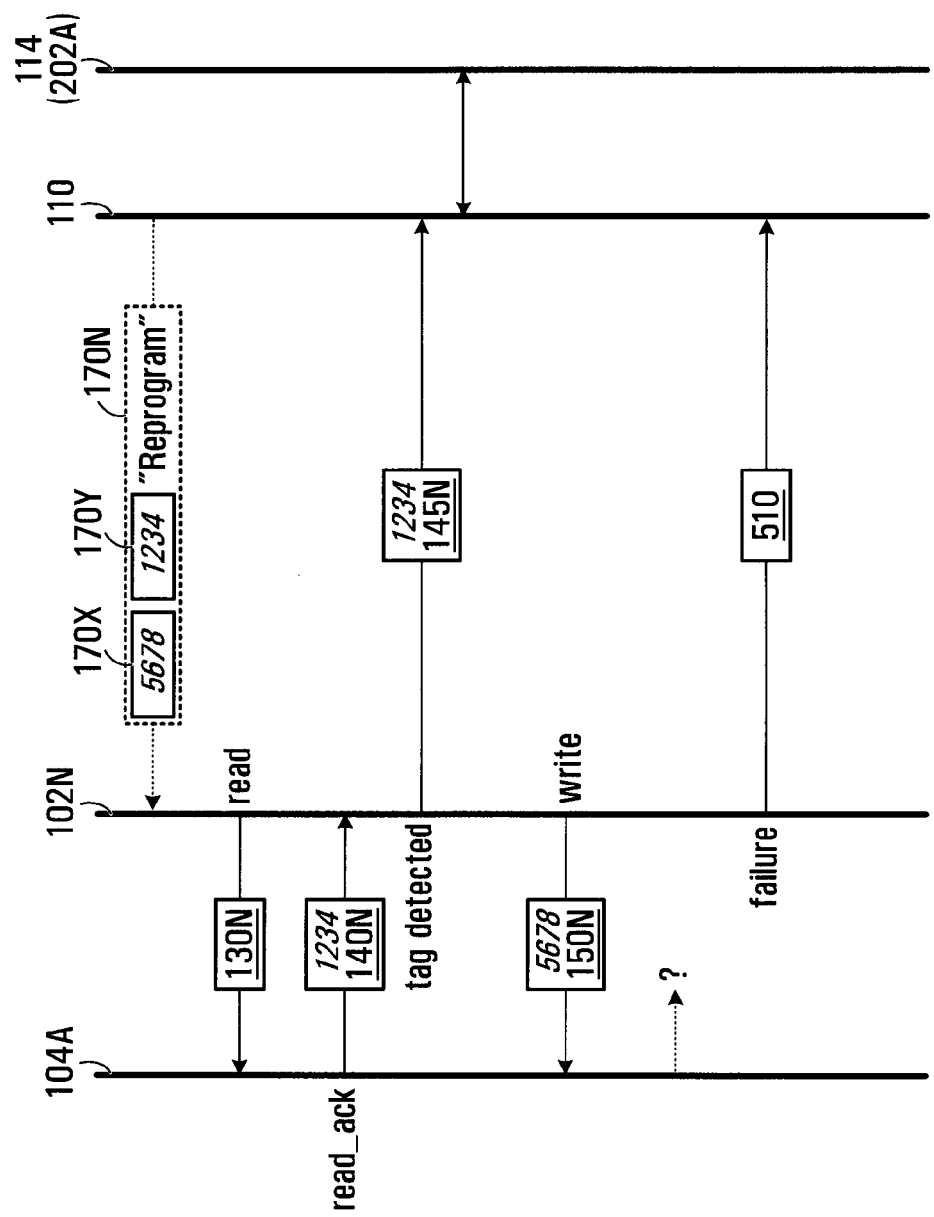
FIG. 5 is a message flow diagram similar to that of FIG. 3, involving the particular tag, the nearby tag reader and the control entity, but where success of the original reprogram operation could not be confirmed.

Persons skilled in the art will appreciate that in the specific example presented above, it was assumed not only that the first reprogramming operation (i.e., modifying the current tag identifier from "1234" to "5678") was successful, but also that tag reader 102N was able to confirm that this operation was successful. However, with reference now to FIG. 5, consider now the case where tag reader 102N would be unable to confirm that the first reprogramming operation was successful, which is equivalent to a conclusion that the first reprogramming operation was potentially unsuccessful. This state of affairs can arise under a first failure scenario whereby the first reprogramming operation fails entirely (in which case storage medium 108A still contains tag identifier "1234") or under a second failure scenario whereby the first reprogramming operation was successful (as a result of which storage medium 108A would actually contain tag identifier "5678") but tag reader 102N nevertheless receives no CONFIRMATION message within a certain amount of time after transmittal of the WRITE message 140 to tag 104A. Both failure scenarios can be detected by tag reader 102N and their occurrence can be signaled to the control entity 110 in the form of a FAILURE message 510. This allows the control entity 110 to conclude that the first reprogramming operation was potentially unsuccessful and to make the appropriate adjustments to its operation, as described herein below. Equivalently, the control entity 110 can make its own determination that the first reprogramming operation was potentially unsuccessful by noticing that no SUCCESS message has been received within a certain amount of time after receipt of the TAG DETECTED message 145N, provided this functionality is invoked. In this case, transmission of the failure message 510 by tag reader 102N is not required.

It should be appreciated that failure to confirm success of the first reprogramming operation could arise under a variety of circumstances, such as from a loss of range during detection, excessive speed of item 106A, etc.

Once the control entity 110 concludes that the first reprogramming operation for tag 104A was potentially unsuccessful, the tag database 114 is updated with relevant information regarding this event. For example, the control entity 110 can modify the tag database 114 so that record 202A, which had been accessible on the basis of tag identifier "1234", will also be accessible on the basis of tag identifier "5678".

Practically speaking, one non-limiting way to implement a suitable modification to the tag database 114 is to modify record 202A so that it is indexed by both tag identifier "5678" and tag identifier "1234". In other words, the same record would be returned by the tag database 114 upon receipt of a query by the control entity 110 based on subsequent detection of tag 104A by a given one of the tag readers 102, regardless of whether the first reprogramming operation referred to above was or was not successful in actuality.

Figure 2B:
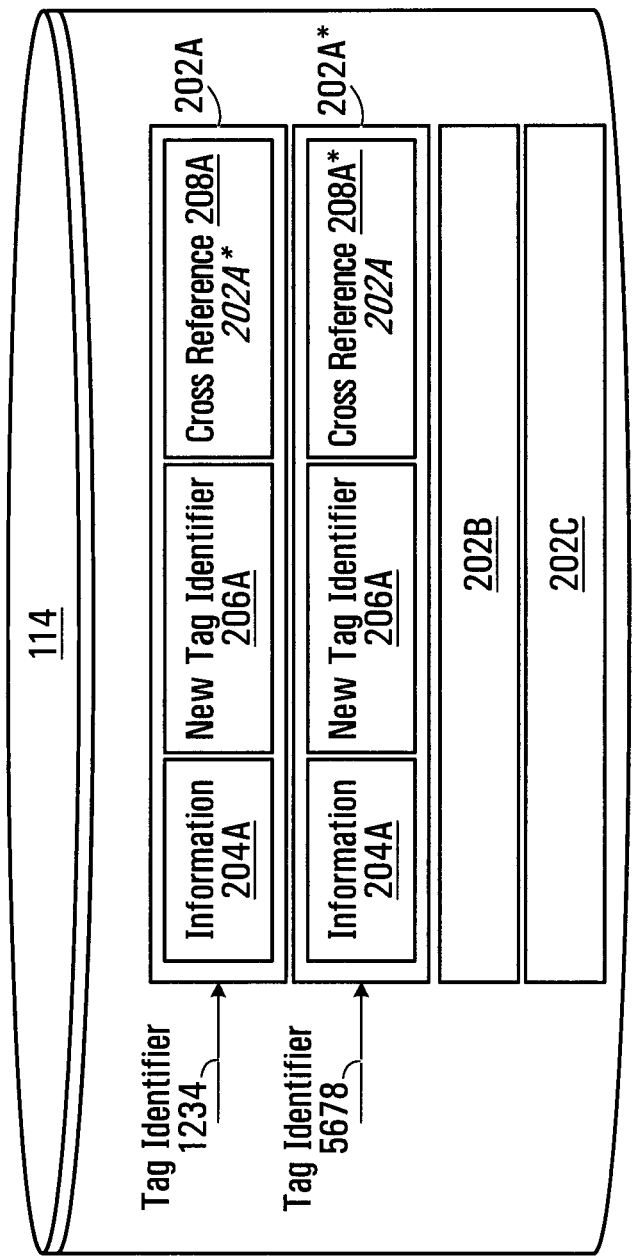
FIG. 2B shows the tag database of FIG. 2A, modified to account for the possibility that a tag may not have been successfully reprogrammed.

With reference to FIG. 2B, another non-limiting way to implement a suitable modification to the tag database 114 is to create a duplicate record 202A* which is indexed by tag identifier "5678" as opposed to tag identifier "1234" (which is used to index record 202A). In other words, the same INFORMATION field 204A and NEW TAG IDENTIFIER field 206A (pertaining to item 106A and tag 104A) will be returned by the tag database 114 upon receipt of a query by the control entity 110 based on subsequent detection of tag 104A by a given one of the tag readers 102, regardless of whether the first reprogramming operation referred to above was or was not successful in actuality. In addition, records 202A and 202A* are cross-referenced, e.g., by filling a respective CROSS-REFERENCE field 208A, 208A* indicative of zero or more related records, whichever the case may be. Thus, in this specific example, CROSS-REFERENCE field 208A is indicative of record 202A* and CROSS-REFERENCE field 208A* is indicative of record 202A.

Additionally, the control entity 110 continues executing the control function, which at step (I) includes generation of a further new tag identifier for tag 104A (e.g., "ABCD"). Also, record 202A (and 202A*, if applicable) is updated by modifying the NEW TAG IDENTIFIER field 206A to reflect tag identifier "ABCD" as opposed to "5678". The aforesaid randomization function 124 may be called upon to assist in generation of tag identifier "ABCD". The randomization function 124 can be used to ensure that certain information used to construct the further new identifier for tag 104A is not predictable on the basis of the any previous tag identifier for tag 104A.

Figure 6:
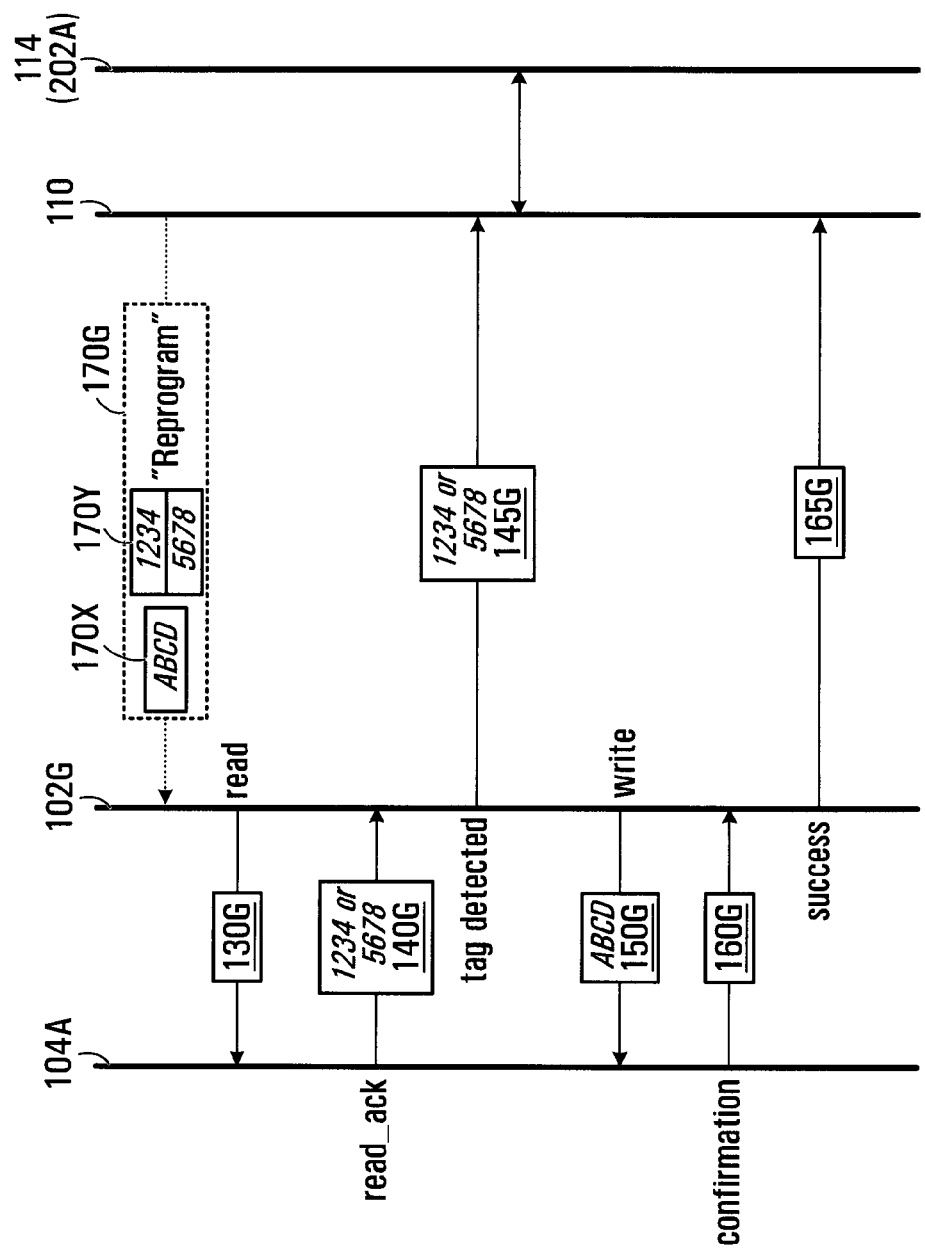
FIG. 6 is a message flow diagram which is a continuation of FIG. 5 and illustrates a further reprogram operation involving the particular tag, a third tag reader and the control entity.

Meanwhile, and with reference to FIG. 6, item 106A continues to move according to its trajectory. By virtue of step (II) of the control function, the control entity 110 determines that item 106A has the potential to encounter yet another one or more of the tag readers 102 (in this case tag reader 102G). Tag reader 102G may be geographically separate from tag reader 102N. Then, by virtue of step (III) of the control function, the control entity 110 sends a REPROGRAM message 170G to the one or more identified tag readers; in this example, the identified tag reader is 102G; also, the first data portion of the REPROGRAM message 170G contains tag identifier "ABCD" and the second data portion of the REPROGRAM message 170G contains both tag identifier "1234" and tag identifier "5678". As a result, tag reader 102G knows that when a nearby tag is detected as having a detected tag identifier of either "1234" or "5678" (i.e., when tag 104A is detected, but not knowing whether the first reprogramming operation was successful), this tag is to be reprogrammed with tag identifier "ABCD".

The remainder of the procedure is similar to that which was described above, except that tag 104A is detected by tag reader 102G rather than by tag reader 102N. Specifically, tag reader 102G sends a READ command 130G to tag 104A, in response to which tag 104A returns a READ_ACK message 140G from tag 104A containing tag identifier "1234" or tag identifier "5678" (recalling that the first reprogramming operation may or may not have successfully taken place). Tag reader 102G then optionally sends a TAG DETECTED message 145G to the control entity 110, advising the latter that a tag with the detected tag identifier (which is either "1234" or "5678") has been detected by tag reader 102G. This allows the control entity 110 to update the tag database 114 with relevant information regarding this event. For example, the control entity 110 can query the tag database 114 on the basis of the detected tag identifier (which is either "1234" or "5678"), which will return record 202A (or 202A*, if applicable, since both of are associated with item 106A). The control entity 110 can update this record (i.e., 202A or 202A*) such as by modifying the (common) INFORMATION field 204A to add the identity of tag reader 102G to the list of tag readers that have been encountered by item 106A along its trajectory.

At this point, tag reader 102G realizes that the detected tag identifier (which is either "1234" or "5678") corresponds to a tag identifier that has been identified in the previously received REPROGRAM message 170G, which carried the new tag identifier "ABCD". Accordingly, tag reader 102G issues a WRITE command 150G to tag 104A to reprogram the latter's storage medium 108A with tag identifier "ABCD" (regardless of whether its current tag identifier is "1234" or "5678"). Tag reader 102G then awaits a response from tag 104G. Meanwhile, tag 104A processes the WRITE command 150G received via interface 118A, retrieves tag identifier "ABCD" contained therein, and causes the portion of storage medium 108A that contained a tag identifier (which is either "1234" or "5678") to be replaced with tag identifier "ABCD". Thus, assuming that this second reprogramming operation was successful, the current tag identifier for tag 104A becomes "ABCD".

Continuing to assume that the second reprogramming operation was successful, tag 104A issues a CONFIRMATION message 160G via interface 118A, which is received by tag reader 102G, thereby allowing tag reader 102G to confirm that the second reprogramming operation was indeed successful. Assuming then that tag reader 102G has confirmed that the second reprogramming operation was successful (based on receipt of the CONFIRMATION message 160G), tag reader 102G can inform the control entity 110 of this fact by issuing a SUCCESS message 165G. Upon receipt of the SUCCESS message 165G, the control entity 110 updates the tag database 114 (more specifically, record 202A in the tag database 114) with relevant information regarding this event.

For example, the control entity 110 can modify the way in which record 202A (and record 202A*, if applicable) are accessed, e.g., by deleting duplicate record 202A* and/or making record 202A now exclusively indexed on the basis of the new version of the current tag identifier (namely "ABCD"). It is also within the scope of the present invention for the control entity 110 to delete any association between item 106A and tag identifiers "1234" and "5678". This process can continue over and over substantially as described above, as item 106A follows its trajectory.

It is of course within the realm of possibility that the second reprogramming operation also cannot be confirmed as having been successful. In this case, a third duplicate record can be created, or an additional field added to record 202A, and the process repeated substantially as described above while taking into consideration the existence of three duplicate records (or a single record indexable on the basis of three tag identifiers) that will point to the same INFORMATION field 204A and NEW TAG IDENTIFIER field 206A in the tag database 114, in response to a query identifying any one of three tag identifiers reserved for tag 104A and item 106A.

Thus, it will be appreciated that the operation of reprogramming a specific tag is effected by a tag reader that has been prepared for a possible encounter with that tag. This can accelerate the reprogramming operation, since the tag reader in question will know, in advance, what the new tag identifier should be for each of a limited number of tags that are susceptible of being observed by that tag reader over the course of a future time period. Some of these tags may have multiple tag identifiers associated therewith, due to the lack of knowledge about the success of a previous reprogramming operation. Meanwhile, the generation of tag identifiers is under the control of the control entity 110, which can add as much or as little randomness between successive instances of the tag identifier as called for by the particular application at hand. For example, at the final tag reader encountered by a given item within the domain of a particular trading party, it is within the scope of the present invention to reprogram the associated tag with a tag identifier that is random, thereby preventing the next trading party in the supply chain (or the consumer) from acquiring any information about the given item through targeted electromagnetic scanning. Another possibility is for the control entity 110 to be governed by a service provider to which different trading partners subscribe. In this scenario, the service provider retains control of the tag database 114, which includes information of significance about the items being tracked. The control entity 110 can then effect re-randomization of tag identifiers at various physical stages of the supply chain or at various time instants. In yet another scenario, at the $M^{th}$ tag reader encountered by a given item, it is within the scope of the present invention to convert the tag identifier of the associated tag into a random format, and then at the $N^{th}$ tag reader encountered by the given item, to convert the tag identifier of the associated tag back into the format it had before it was reprogrammed by the $M^{th}$ tag reader.

Of course, while the above description has focused on the tracking of items within a supply chain, it should be appreciated that this is but one application of the present invention, which can be useful in other areas, including but not limited to any application where items have mobility and where it would be beneficial to reprogram their associated tags. Such applications may include asset management, inventory management at the case, pallet or item-level, and personnel tracking, to name a few non-limiting possibilities.

While specific embodiments of the present invention have been described and illustrated, it will be apparent to those skilled in the art that numerous modifications and variations can be made without departing from the scope of the invention as defined in the appended claims.

What is claimed is:

1. A system for tracking an item associated with a read/writable tag programmed with a current identifier, the system comprising:
   a plurality of tag readers;
   a control entity, remote from said plurality of tag readers, configured to send to at least one of said tag readers, before a presence of said tag is detected at said at least one of said tag readers, a next identifier associated with said current identifier;
   upon receipt of the next identifier, said at least one of said tag readers being configured to reprogram a tag detected to have said current identifier with the next identifier, wherein reprogramming of said tag with the next identifier causes the next identifier to replace said current identifier in said tag.

2. The system defined in claim 1, wherein said control entity is further configured to identify each of said at least one of said tag readers as being a tag reader that the item has a potential to encounter.

3. The system defined in claim 2, wherein said at least one of said tag readers comprises a specific tag reader that the item is expected to encounter.

4. The system defined in claim 2, wherein said at least one of said tag readers comprises a plurality of tag readers.

5. The system defined in claim 2, wherein to identify said at least one of said tag readers, the control entity is configured to consult a database that specifies a scheduled trajectory associated with the item.

6. The system defined in claim 5, wherein said trajectory associated with the item includes points along a supply chain, at least one of said points being in a vicinity of at least one of said at least one of said tag readers.

7. The system defined in claim 3, wherein to identify the specific tag reader, the control entity makes a prediction based on past movement of the item.

8. The system defined in claim 1, wherein said at least one of said tag readers is configured to receive identifiers from nearby tags and to compare each received identifier to the current identifier, wherein said at least one of said tag readers is considered to have detected the current identifier when one of the received identifiers corresponds to the current identifier.

9. The system defined in claim 8, wherein said at least one of said tag readers is configured to be attentive to receipt of a confirmation from said tag that said tag has been reprogrammed with the next identifier.

10. The system defined in claim 9, wherein said at least one of said tag readers is configured to indicate to the control entity that said confirmation has been received from said tag.

11. The system defined in claim 1, further comprising a database that stores an association between the current identifier and the next identifier.

12. The system defined in claim 11, wherein the control entity is configured to erase its knowledge of the next identifier.

13. The system defined in claim 12, wherein to erase its knowledge of the next identifier the control entity is configured to delete said association in said database.

14. The system defined in claim 11, wherein the control entity is configured to access a randomization function in order to impart a degree of randomness to the next identifier relative to the current identifier.

15. The system defined in claim 10, wherein the control entity is configured to identify at least one other of said tag readers that the item is expected to encounter, and wherein the control entity is configured to send to the at least one other of said tag readers a further identifier associated with the next identifier.

16. The system defined in claim 15, wherein upon receipt of the further identifier, said at least one other of said tag readers is configured to reprogram a tag detected to have the next identifier with the further identifier, wherein reprogramming of said tag with the further identifier causes the further identifier to replace the next identifier in said tag.

17. The system defined in claim 16, wherein upon receipt by the control entity of a confirmation from said tag that said tag has been reprogrammed with the next identifier, said at least one other of said tag readers is configured to receive identifiers from nearby tags and to compare each received identifier to the next identifier, and wherein said at least one other of said tag readers is considered to have detected the next identifier when one of the received identifiers corresponds to the next identifier.

18. The system defined in claim 17, further comprising a database that stores an association between the next identifier and the further identifier.

19. The system defined in claim 18, wherein the control entity is configured to access a randomization function in order to impart a degree of randomness to the further identifier relative to the next identifier.

20. The system defined in claim 16, wherein in the absence of receipt by the control entity of a confirmation from said tag that said tag has been reprogrammed with the next identifier, said at least one other of said tag readers is configured to receive identifiers from nearby tags and to compare each received identifier to the current identifier and the next identifier, wherein said at least one other of said tag readers is considered to have detected the current identifier when one of the received identifiers corresponds to the current identifier and wherein said at least one other of said tag readers is considered to have detected the next identifier when one of the received identifiers corresponds to the next identifier.

21. The system defined in claim 20, further comprising a database that stores an association among the current identifier, the next identifier and the further identifier.

22. The system defined in claim 1, wherein the next identifier abides by a first format, and wherein the current identifier abides by a second format that is different from said first format.

23. The system defined in claim 1, wherein said at least one of said tag readers comprises a radio frequency transceiver.

24. A method for tracking an item associated with a read/writable tag programmed with a current identifier, the method comprising:
sending, from a control entity, to at least one of a plurality of tag readers remote from said control entity, before a presence of said tag is detected at said at least one of said tag readers, a next identifier associated with said current identifier; and
at the at least one tag reader, reprogramming a tag detected to have said current identifier with the next identifier, wherein said reprogramming causes the next identifier to replace said current identifier in said tag.

25. The method defined in claim 24, further comprising identifying each of said tag readers as a tag reader that the item has a potential to encounter.

26. The method defined in claim 25, wherein reprogramming said tag comprises loading said next identifier into a storage medium on said tag.

27. The method defined in claim 26, wherein reprogramming said tag further comprises loading said next identifier into an area of the storage medium where the current identifier had until then been stored.

28. A computer-readable medium comprising computer-readable program code which, when interpreted by a computing apparatus, causes the computing apparatus to execute a method of tracking an item associated with a read/writable tag programmed with a current identifier, the computer-readable program code comprising:
first computer-readable program code for causing the computing apparatus to identify at least one tag reader, remote from the computing apparatus, that the item has a potential to encounter; and
second computer-readable program code for causing the computing apparatus to send to said at least one tag reader, before a presence of said tap is detected at said at least one of said tap readers, a next identifier for reprogramming of said tag so as to replace the current identifier in said tag with the next identifier.

29. A tag reader used in a system for tracking items associated with read/writable tags programmed with respective current identifiers, the tag reader comprising:
means attentive to receipt, from a remote control entity, before a presence of a tap having a particular current identifier is detected, of a next identifier associated with the particular current identifier;
means for detecting a presence of a tag having said particular current identifier; and
means for reprogramming the tag with the next identifier in response to said detecting, wherein reprogramming the tag with the next identifier causes the next identifier to replace said particular current identifier in the tag.

30. A method implemented by a tag reader used in a system for tracking items associated with read/writable tags programmed with respective current identifiers, said method comprising:
receiving, from a remote control entity, before a presence of a tap having a particular current identifier is detected, a next identifier associated with the particular current identifier;
detecting a presence of a tag having said particular current identifier; and reprogramming the tag with the next identifier in response to said detecting, wherein reprogramming the tag with the next identifier causes the next identifier to replace said particular current identifier in the tag.

* * * * *